US012659337B2

(12) United States Patent　　(10) Patent No.:　　US 12,659,337 B2

Philip et al.　　(45) Date of Patent:　　Jun. 16, 2026

(54) GENERATION AND ANALYSIS ENGINE IDENTIFICATION AND MONITORING OF ENDPOINT ACTIVITY RESPONSE

(71) Applicant: BANK OF AMERICA CORPORATION, Charlotte, NC (US)

(72) Inventors: Charles Philip, Mumbai (IN); Vaibhav Bansal, Delhi (IN); Alkesh Gupta, Gonda (IN); Smit Sawant, Mumbai (IN); Osheen Pandita, Jammu (IN); Devansh Upadhyay, Mumbai (IN); Ashley Peter Oliveira, Mumbai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 209 days.

(21) Appl. No.: 18/216,696

(22) Filed: Jun. 30, 2023

(65) Prior Publication Data

US 2025/0007940 A1　　Jan. 2, 2025

(51) Int. Cl.
H04L 9/40　　(2022.01)
G06Q 10/0635　　(2023.01)

(52) U.S. Cl.
CPC ..... H04L 63/1433 (2013.01); G06Q 10/0635 (2013.01); H04L 63/1425 (2013.01)

(58) Field of Classification Search
CPC ............ H04L 63/1433; H04L 63/1425; G06Q 10/0635
See application file for complete search history.

(56) References Cited

U.S. PATENT DOCUMENTS

| | | | |
|---|---|---|---|
| 9,781,146 | B2 | 10/2017 | Sridhar |
| 10,043,004 | B2 | 8/2018 | Cornell et al. |
| 10,043,012 | B2 | 8/2018 | Cornell et al. |
| 10,116,681 | B2 | 10/2018 | Cornell et al. |
| 10,250,586 | B2 | 4/2019 | Brucker et al. |
| 10,395,041 | B1 | 8/2019 | Youngberg et al. |
| 10,503,910 | B2 | 12/2019 | Johns |
| 10,740,469 | B2 | 8/2020 | Zheng et al. |
| 10,956,579 | B2 | 3/2021 | Youngberg et al. |
| 11,030,322 | B2 | 6/2021 | Bagheri et al. |
| 11,087,002 | B2 | 8/2021 | Siman et al. |
| 11,113,406 | B2 | 9/2021 | Youngberg et al. |
| 11,190,538 | B2 | 11/2021 | Paturi et al. |
| 11,328,058 | B2 | 5/2022 | Youngberg |
| 11,550,923 | B2 | 1/2023 | Weber |
| 11,601,462 | B2 | 3/2023 | Feiman et al. |
| 11,604,883 | B2 | 3/2023 | Bhalla et al. |

(Continued)

*Primary Examiner* — Joseph P Hirl
*Assistant Examiner* — Thomas A Gyorfi
(74) *Attorney, Agent, or Firm* — Moore & Van Allen PLLC; Nicholas C. Russell

(57)　　ABSTRACT

Systems, computer program products, and methods are described herein for the identification and monitoring of endpoint activity response. The present disclosure is configured to intercept a message via an input engine, forward the intercepted message data to an intelligence engine, train the intelligence engine to identify one or more security issues in the intercepted message data, generate a template of the message which emulates the message by removing one or more links or attached files, analyze the intercepted message data to determine one or more message characteristics related to a user, and trigger the dispatch of the message template and a gamification link to the intended recipient of the message via a new message.

15 Claims, 5 Drawing Sheets

(56)  References Cited

U.S. PATENT DOCUMENTS

| | | | |
|---|---|---|---|
| 11,669,623 B2 | 6/2023 | Esperer et al. | |
| 2015/0309813 A1 | 10/2015 | Patel | |
| 2018/0107821 A1 | 4/2018 | Eshkenazi et al. | |
| 2020/0389486 A1* | 12/2020 | Jeyakumar | H04L 63/20 |
| 2021/0250369 A1* | 8/2021 | Åvist | G06F 21/552 |
| 2021/0390181 A1* | 12/2021 | McClay | G06N 20/00 |
| 2021/0407308 A1* | 12/2021 | Brubaker | H04L 63/1433 |
| 2022/0067174 A1 | 3/2022 | Gupta | |
| 2022/0094702 A1* | 3/2022 | Saad Ahmed | H04L 63/1416 |
| 2022/0261480 A1 | 8/2022 | Youngberg et al. | |
| 2022/0345485 A1* | 10/2022 | Kras | H04L 51/212 |
| 2023/0067084 A1 | 3/2023 | Mohanty et al. | |
| 2023/0171283 A1* | 6/2023 | Rodriguez | H04L 63/1483 |
| | | | 726/25 |

* cited by examiner

GENERATION AND ANALYSIS ENGINE IDENTIFICATION AND MONITORING OF ENDPOINT ACTIVITY RESPONSE

TECHNOLOGICAL FIELD

Example embodiments of the present disclosure relate to identification and monitoring of endpoint activity response.

BACKGROUND

Currently available techniques for ensuring message security within organizations falls short of the comprehensive protection mechanisms required to conduct endpoint analysis in cases where a specific endpoint repeatedly sends out malfeasant communications. Applicant has identified a number of deficiencies and problems associated with message security within an organization. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for ensuring message security within organizations via an analysis engine for identification and monitoring of endpoint activity response.

The analysis engine of the present invention is designed to scrutinize the headers of communications in order to identify the intended recipients. It further inspects the communications for the presence of malfeasant links or attachments. If an individual is targeted repeatedly, a gamification link is initiated by the analysis engine. Concurrently, the engine dispatches any malfeasant file contained in the communication for Static Application Security Testing (SAST) and Dynamic Application Security Testing (DAST) analysis. Additionally, host endpoints are monitored by the endpoint detection team to discern if a particular host is being utilized repeatedly for dispatching malfeasant communications.

An intelligence engine reconstructs a malfeasant template, devoid of the malfeasant links and files, and relays it to the security operations center (SOC) team. This process serves the dual purpose of training the team regarding the most recent communications and enhancing the engine's ability to detect future malfeasant attempts by storing the new types of templates.

Further, in the event that a malfeasant communication contains a file, it is forwarded for SAST/DAST analysis while the host endpoint solution scans the host utilized for dispatching the malfeasant communication. The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
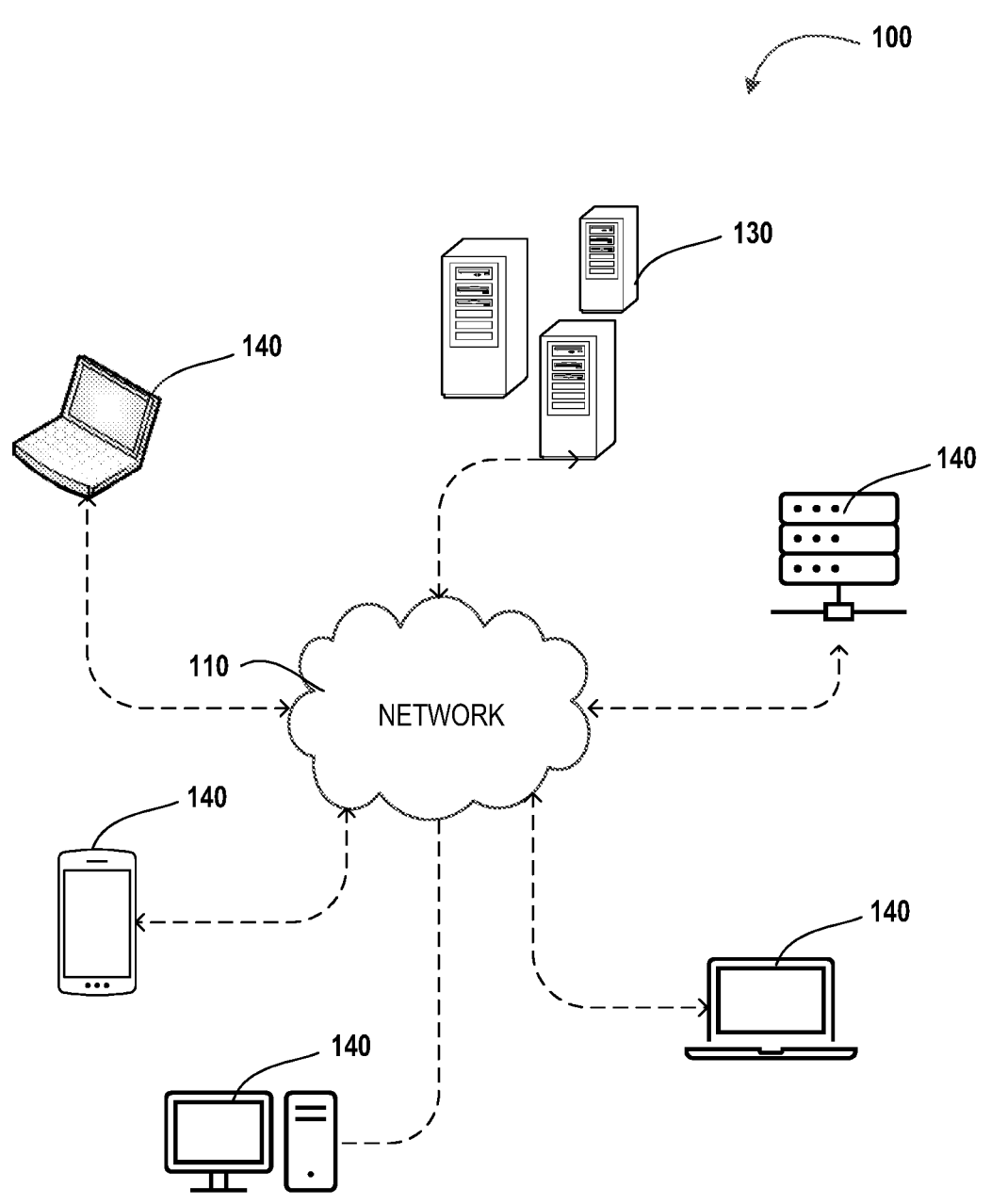
Figure 1B:
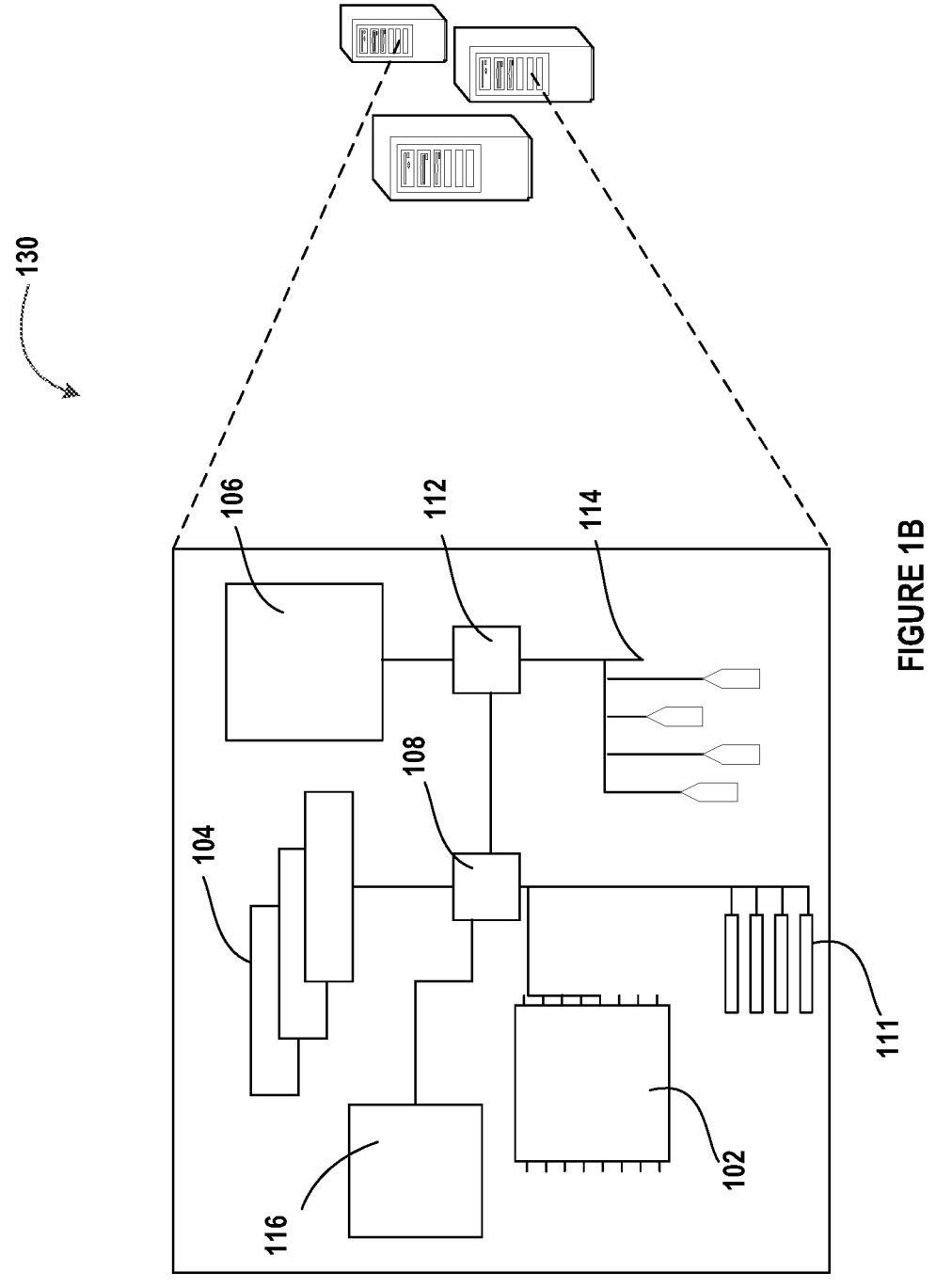
Figure 1C:
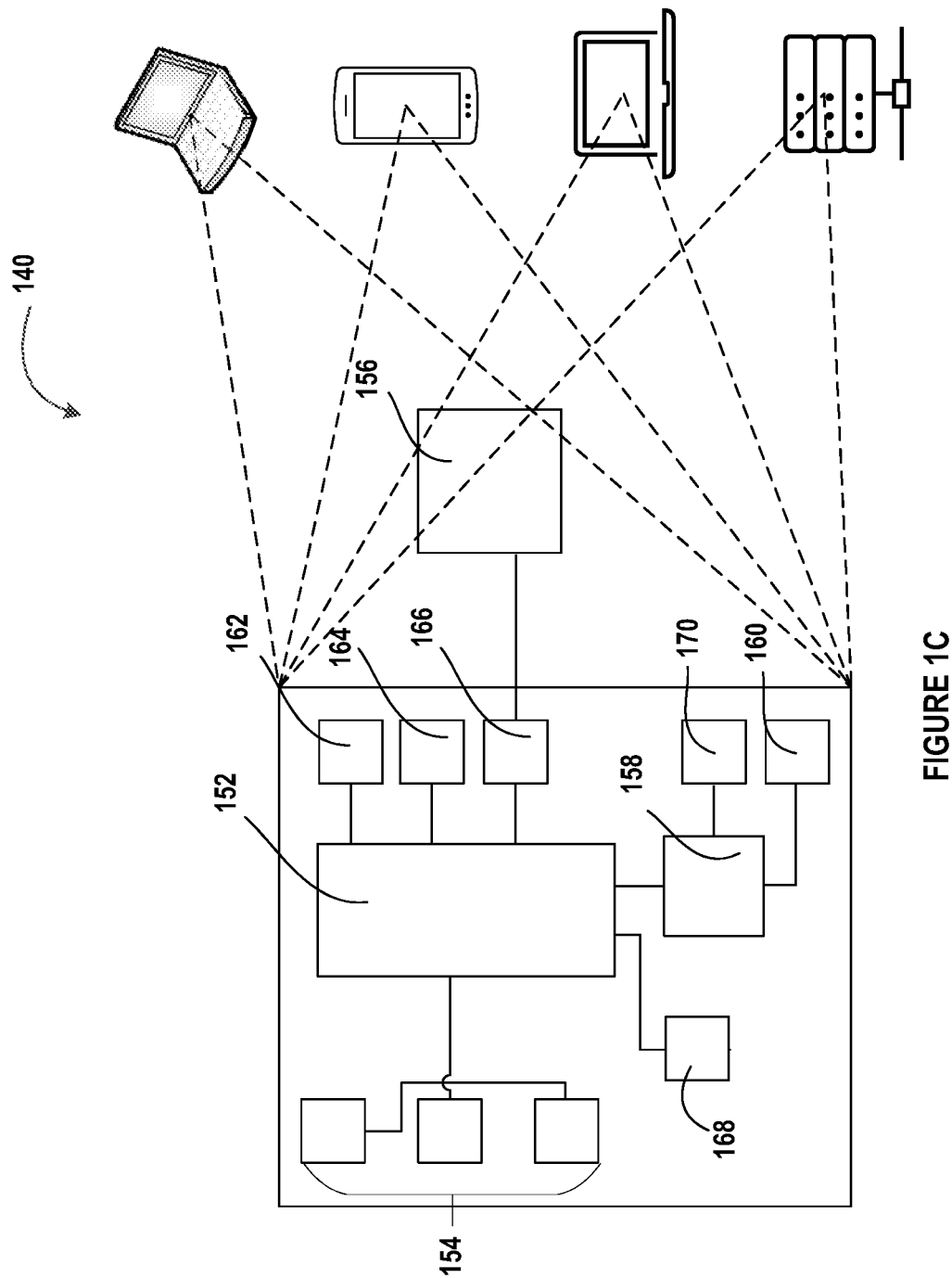
Figure 2:
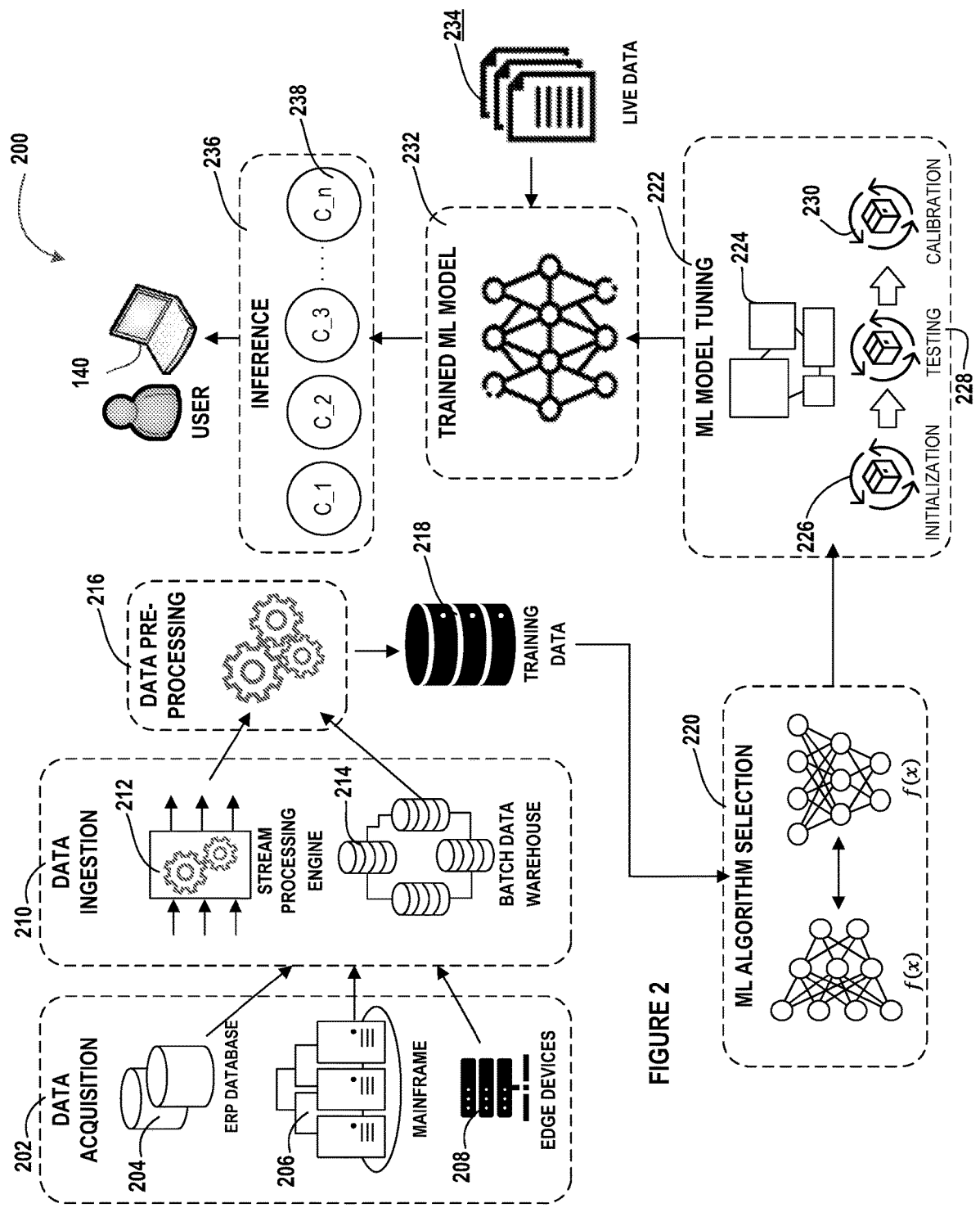
Figure 3:
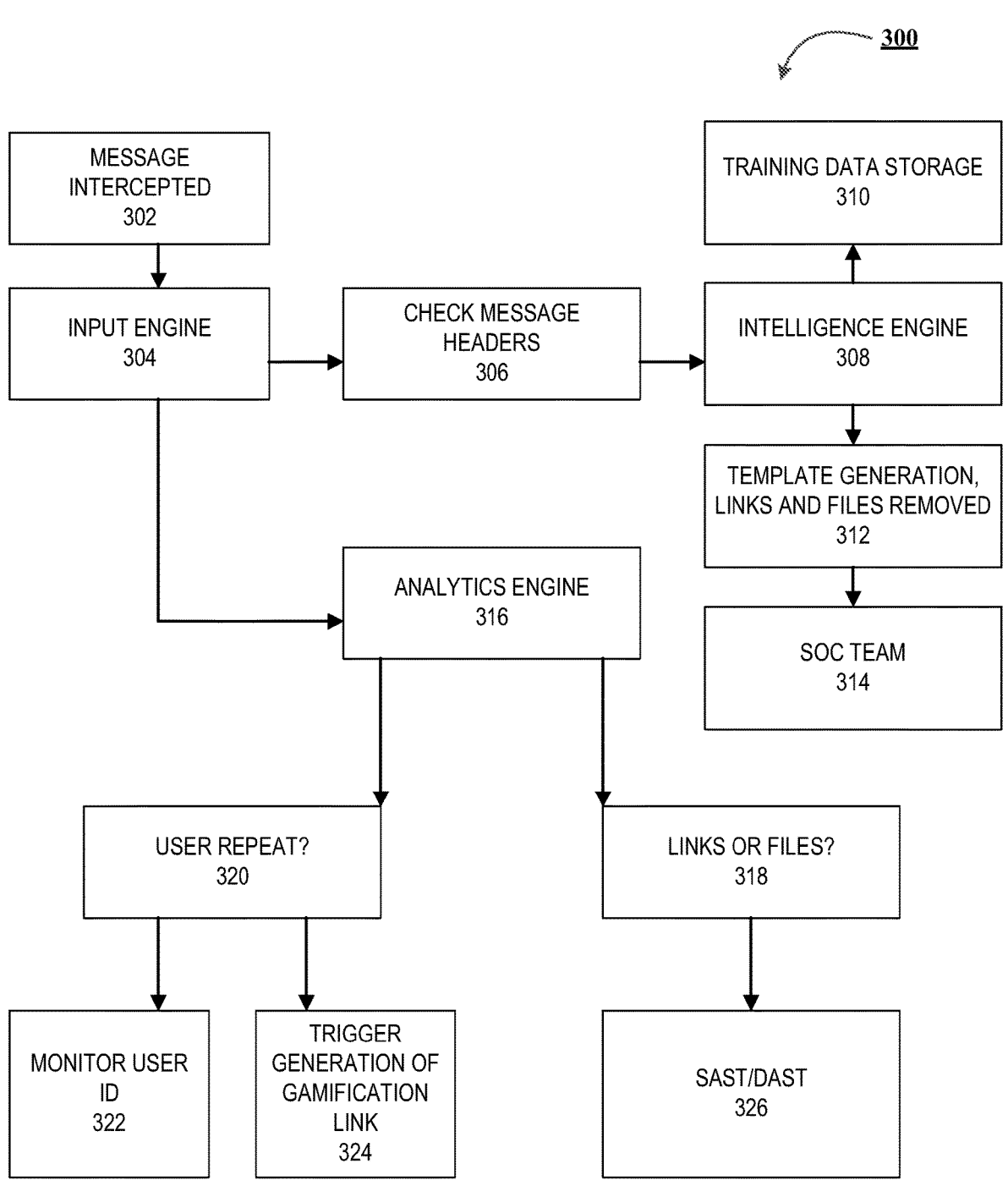

FIGS. 1A-1C illustrate technical components of an exemplary distributed computing environment 100 for ensuring message security within organizations via an analysis engine for identification and monitoring of endpoint activity response, in accordance with an embodiment of the disclosure;

FIG. 2 illustrates an exemplary machine learning (ML) subsystem architecture 200, in accordance with an embodiment of the invention; and FIG. 3 illustrates a process flow for ensuring message security within organizations via an analysis engine for identification and monitoring of endpoint activity response, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As used herein SAST (Static Application Security Testing) is a testing methodology that analyzes source code to find security vulnerabilities that make an organization's applications susceptible to attack. It's done at the very early stage of the development life cycle and doesn't require the application to be running. DAST (Dynamic Application Security Testing) is a testing methodology in which an application is tested from the outside. The aim is to identify vulnerabilities that may be present in a running web application and is typically performed once the application has been deployed.

As used herein, "pharming" refers to a type of cyberattack where malicious individuals or organizations attempt to redirect users to fake websites or servers. In a pharming attack, the attackers manipulate the DNS (Domain Name System) records or the hosts file on a user's computer or network, redirecting the user's legitimate website requests to fake websites that resemble the original ones. The goal of pharming is to trick users into providing sensitive information, such as usernames, passwords, credit card details, or other personal data, by making them believe they are interacting with a legitimate website or service. This can lead to lost identity, financial losses, or unauthorized access to confidential information. Pharming attacks can be conducted through various methods, including taking advantage of vulnerabilities in DNS servers, infecting users' computers with malware that modifies DNS settings, sending fake emails that impersonate known, trusted individuals or organizations, or compromising routers or other network devices. It is a serious threat to online security and requires vigilance and preventive measures to mitigate the possibility of attacks.

In many cases, large entities' employees receive a vast number of emails, each containing various attachments with different extensions. In some cases, attachments are scanned by firewalls or other specialized software or tools used for malfeasant email detection. However, currently, there's no tool in place to analyze emails that firewalls or software rejects, making it difficult to identify the intended targets of these emails within an organization. Additionally, in instances where an employee is the subject of these malfeasant messages multiple times using diverse methods and email templates, there is no available tool to aid them in recognizing and properly reporting such emails. There is also a lack of analysis carried out on files within malicious emails. Further, often no endpoint analysis is conducted even when an endpoint is used repeatedly to send these emails.

The invention's input module analyzes email headers to discern the intended recipient of an email, subsequently checking for the presence of malicious links or attachments. the intelligence module recreates the malicious template, excluding any harmful links or files, and forwards it to the security operations center (SOC) team. This aims to train them on recent emails while also storing the template to improve future malfeasant email identification. An analytics module engages a gamification link if an employee is the subject of a malfeasant email multiple times. It also directs any malicious file found in the email for static application security testing/dynamic application security testing (SAST/ DAST) analysis.

Furthermore, an endpoint detection team may be provided data from the invention's modules in order that they can monitor host endpoints to identify if the same host is being repeatedly used to disseminate malicious emails. The input module examines email headers to establish the intended recipient of the malicious email and to verify whether the email contains a malicious link or file. An Intelligence module reproduces the malicious template by removing harmful content from the email, sending it to the SOC team for training. This module also retains new template types to improve its proficiency in identifying future unauthorized attempts at gaining personal information via subversive means. In the event of an employee being targeted multiple times, the analytics module initiates a gamification link. If a malicious file is present in the email, it is sent for SAST/ DAST analysis, and the host endpoint solution scans the host used for sending the malicious email.

As such, the invention aims to train the SOC team on new types of unauthorized attempts at gaining personal information via subversive means, thereby enabling them to anticipate future threats effectively. Through the engagement of a gamification link, the invention ensures that employees who are targeted multiple times receive proper training. This assists them in identifying and reporting malicious emails. The analytics module of the invention will send any malicious file for SAST/DAST analysis. This allows the team to identify the operating system or application within the employee's workstation that is being targeted.

The present disclosure offers a technical solution to a significant problem in the field of cybersecurity. The issue at hand involves the difficulty of identifying, analyzing, and training personnel to counteract new types of malfeasant emails within an organization. The technical solution outlined herein, referred to as the invention, allows for comprehensive analysis, early anticipation, and effective employee training. In particular, the invention is a marked improvement over existing solutions to the problem of malfeasant emails which attempt to gather useful private information or compromise user devices, accounts, or the like. It streamlines the process by reducing the number of steps to achieve the solution, thus conserving processing, storage, and network resources. Furthermore, it offers a more accurate solution to the problem, minimizing the resources required to fix errors that could arise from a less accurate approach. By automating several steps and eliminating manual input, the invention enhances the speed and efficiency of the process while saving computing resources. It also optimizes the amount of resources used, reducing network traffic and the load on existing computing resources.

Moreover, the technical solution delineated herein deploys a rigorous, computerized process to perform specific tasks and activities not previously carried out. In specific implementations, the invention bypasses a series of steps formerly implemented, further conserving computing resources. By analyzing email headers and malicious content, training the SOC team on new types of malfeasant behavior, engaging a gamification link for users who are repeatedly the recipient of such communications, and implementing SAST/DAST analysis on malfeasant files, the invention offers a comprehensive approach to addressing malfeasant emails received in an organization.

FIGS. 1A-1C illustrate technical components of an exemplary distributed computing environment 100 for ensuring message security within organizations via an analysis engine for identification and monitoring of endpoint activity response, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O)

device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port

114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for ensuring message security within organizations via an analysis engine for identification and monitoring of endpoint activity response, in accordance with an embodiment of the disclosure. The process for securing email communication within an entity involves several intricate steps executed by the invention. As shown in block 302, the process begins whereby the system intercepts a message for inspection and analysis via the input engine 304, intelligence engine 308, and analytics engine 316. The input engine 304 comprises multiple devices and software implementations in order to safely intercept, analyze, and begin to ensure security of incoming messages. For instance, to intercept, analyze, and secure enterprise-wide emails for inspection by the security operations center (SOC), firewalls can be configured to monitor and control incoming and outgoing network traffic based on predetermined security rules. They create a barrier between the secured internal network and potentially less secure external networks such as the internet. Additionally, in some embodiments, an intrusion prevention system (IPS) can be used monitor network traffic to detect and prevent vulnerabilities, which involve activities that can harm the network.

Additionally, in some embodiments, email security gateways or servers may handle all incoming and outgoing email traffic within the entity. They offer features like spam filtering, protection, data leak prevention, and virus scanning. In terms of software, various existing solutions can intercept and scan emails for threats, filtering out information attempts, spam, and malware. In other embodiments, security information and event management (SIEM) Software may collect, store, and analyze security data from various sources within the enterprise, including email systems, for possible issues. One of ordinary skill in the art will appreciate that multiple programming languages may be employed in any of the above embodiments, including Python, Java, or some instances PowerShell. Python's selection of libraries (e.g., Scapy for packet capture/analysis, or pandas for data analysis, or the like) may make it a preferred language for some email interception and analysis embodiments. However, it is understood that the specifics of the infrastructure, devices, and software may depend heavily on the organizational setup, the email server solution in use, regulatory requirements, and the complexity of the email security needs in a particular embodiment or use-case, and these descriptions are provided for exemplary purposes. In some embodiments, as emails traverse through the network 110, they may first encounter the firewall, a primary defense mechanism designed to filter and control all incoming and outgoing traffic, which may be implemented by the input engine 304 as described above.

Following this, an advanced email security tool may generate a decision to either allow or reject the incoming mail, based on its in-built algorithms and detection capabilities. Emails that are deemed potentially harmful are subsequently intercepted by the input engine 304, in part by checking message headers for known malfeasant information as indicated in block 306. The input engine 304 is designed to scrutinize and analyze these intercepted emails in depth. It performs a header lookup to identify the intended recipient(s) of the email, followed by a thorough examination of the content to identify any malfeasant links or attachments that the email may contain.

Subsequently, the gathered information via input engine 304 is relayed to the intelligence engine 308 of the invention. This engine is responsible for recreating a sanitized version of the malfeasant email template, purging all malfeasant links and files in the process. This is an essential part of the solution as it allows the engine to familiarize itself with new types of unauthorized requests for personal information and thereby improving its future detection capabilities. In some embodiments, the intelligent engine 308 utilizes the machine learning technology capabilities discussed with regard to FIG. 2. Machine learning, particularly the subfield of natural language processing (NLP), can be extensively applied to enhance the performance of the intelligence engine 308 in the invention. The process starts with the input engine 304 which collects and forwards information from the intercepted malfeasant emails to the intelligence engine. The intelligence engine 308 receives raw email data which typically includes the body of the email, the subject line, sender information, and attachments. This data needs to be processed and transformed into a format that the machine learning algorithms can understand.

In some embodiments, textual data is tokenized by breaking down the text into individual words or phrases (tokens). Punctuation, special characters, and stop words (e.g., words like 'is', 'the', 'and', or the like) are usually removed in this process. If attachments are present, they may be analyzed using other specific tools for file analysis. The result of this step is a dataset that is prepared for machine learning processing via the intelligence engine 308. Using various NLP techniques, the important features or characteristics of the emails are extracted. In some embodiments, these may include the frequency of certain words, phrases or links, the sentiment of the text, and patterns in the email's structure or syntax. One of ordinary skill in the art will appreciate that these features can be used to identify key patterns associated with unauthorized requests for personal information.

A machine learning model of the intelligence engine 308 may also be trained using a large dataset of historical emails which have been labeled as either legitimate or malfeasant. During the training process, the model learns to identify patterns in the email content that correlate with each category. This could involve supervised learning algorithms such as logistic regression, decision trees, or neural networks. The trained model can then predict the classification of new, unseen emails. The intelligence engine 308 uses the trained machine learning model to generate a sanitized version of each intercepted email. The model identifies and removes malfeasant links and attachments, effectively 'cleaning' the email. This sanitized email serves as a template for recognizing similar threats in the future.

Furthermore, in some embodiments, the intelligence engine 308 may continually update its model with new data. As new malfeasant emails are identified and sanitized, they are added to the training dataset, allowing the model to continually adapt to new threats and strategies. This continuous learning process, also known as online learning or incremental learning, enhances the system's ability to identify and respond to ever-evolving unauthorized requests for personal information. In some embodiments, as mentioned with regard to FIG. 2, the machine learning capabilities of the Intelligence Engine 308 can be further refined by employing deep learning models for more complex pattern recognition, or reinforcement learning models to dynamically adapt to changing threat patterns. This allows the system to develop a highly sophisticated understanding of malfeasant email strategies and to respond effectively in real-time. In some embodiments, a recreated template, as indicated by template generation block 312, is then shared with the security operations center (SOC) team 314. This team is trained on the newly identified unauthorized requests for personal information, thereby equipping them with the knowledge to deal with similar attempts that target users in the future.

In tandem with these operations, the analytics engine 316 is persistently monitoring and assessing the intercepted emails for either malfeasant links or files or both. This engine maintains a comprehensive record of the number of times a specific user has been targeted, making it a useful tool for identifying patterns and high-value targets. In cases where the email contains a malfeasant file or link, the file or link is extracted from the email and sent for Static and Dynamic Application Security Testing (SAST/DAST) analysis, as indicated in blocks 318 and 326, to understand its characteristics and intended function. If a user is persistently sent malfeasant emails, as indicated in block 320, a link to a training module, styled as a gamified interactive lesson on identifying unauthorized requests for personal information, is dispatched to the user to improve their detection and response capabilities, as shown in block 324. In some embodiments, the system may track the number of malfeasant emails each user receives over a specified time period. This may be done using a database, such as training data storage 310, to store the user-email relationships and a programmatic counter for each user that increments every time a malfeasant email is identified. The system may perform a threshold check to see if the count of malfeasant emails for a user exceeds a pre-defined threshold. This would typically be done in an "if" statement or a similar control structure. If the count of malfeasant emails for a user exceeds a pre-defined threshold, the system may generate and transmit a message containing a gamified training module to the user, such as a short educational video and quiz directed to the particular issue the user is experiencing. This could involve sending an email with a link to the training module, which might be hosted on an internal or external platform. The email dispatch may be handled via the entity's email server API or using a dedicated email dispatch service.

It is understood that the module needs to be developed into a software application before it can be shared with end users. In some embodiments, this is done using a web application, which is accessible through a web browser, or a standalone application for various platforms. The development process involves a front-end and back-end development, wherein front-end development involves coding the user interface and interactions using languages like HTML, CSS, and JavaScript. A visual layout, interactive elements, and user feedback mechanisms are created. It is understood that back-end development may involve provisioning servers, databases, and APIs to handle data storage and communication between the client-side and server-side of the application. Languages like Python, Java, Ruby, or JavaScript (Node.js) could be used, along with a web framework associated which each respective coding language. Once the module is developed, it needs to be deployed on a server so that users can access it. This involves setting up a web server (e.g., Apache, Nginx, or the like) to host the application, or using a cloud service provider. When the user meets the criteria for receiving the training module (as determined by the email monitoring process), the module is dispatched to the user. In some embodiments, this may involve sending an email to the user with a link to the training module. It is understood that this dispatch could be achieved using a server-side script and an email service or API, like SendGrid, MailChimp, or the built-in email services of most programming languages.

Moving further with respect to FIG. 3, the system may monitor the user's user identification (ID), as indicated in block 322, in order to intercept further malfeasant attempts for unauthorized gathering of personal information from that specific user, essentially heightening the security standard and analysis with respect to the specific user for a period of time, such as a number of weeks, months, or the like, as determined by the frequency of the communications the user receives. For instance, if the user receives an average of 2 malfeasant unauthorized attempts to gather personal information in the span of 2 weeks, the system would implement a monitoring of the user ID, as indicated in block 322, for that user for at least a multiple of that amount of time, such as a 4 weeks, 6 weeks, or the like, in order to gather an appropriate amount of data to attempt to determine a pattern via the intelligence engine 308.

It is understood that an endpoint detection team of trained users may be entrusted with the investigation of hosts that have been recurrently targeted by malfeasant emails. As such, they may be granted user-specific access to training data storage 310. In some embodiments, the training data storage may be indexed in order to enhance the endpoint detection team's ability to locate relevant data. The endpoint detection team may perform a detailed analysis to understand the patterns, potential vulnerabilities, and methods used by the perpetrators, thereby contributing to the holistic defense strategy against unauthorized requests for personal information. It is understood that indexing training data storage 310 effectively is crucial for the swift retrieval of relevant information. This capability allows an endpoint detection team to promptly locate pertinent emails and patterns, which in turn facilitates advising users on potential problems in a timely manner. To index training data storage for identifying malfeasant emails, in some embodiments the system may divide emails into various categories based on their characteristics, such as sender, subject, content, attachments, or the like. This first level of classification facilitates the swift location of emails with specific properties.

In other embodiments, the system may assign relevant tags or labels to emails based on their content, source, and nature of threat. For example, tags could indicate whether an email contains unauthorized attempts at gaining personal information via subversive means such as links or malware attachments. This process facilitates the ability to pull up all emails associated with a certain type of issue. In some embodiments, the system may include a time and date when each email was received. This information can be used to identify patterns related to the timing of malfeasant email attacks, which can be crucial in predicting future issues. In other embodiments, the system may generate unique hashes for each email or its components (e.g., attachments, or the like). This allows for quick comparisons and identification of duplicate or similar emails. In still further embodiments, full-text indexing may be implemented to make the content of the emails searchable. This involves creating an index of every unique word in the email content and storing the location of each word's occurrence.

It is understood that the use of machine learning algorithms to recognize patterns and classify emails may be employed in other embodiments. This may involve supervised learning (where the model learns from labeled examples) or unsupervised learning (where the model identifies patterns and clusters in the data). As such, the endpoint detection team may utilize the invention to easily locate relevant emails or patterns by querying the index of training data storage 310. This information can then be used to alert users about potential issues, provide personalized guidance, and improve the overall security of the organization. Furthermore, this indexed data can serve as the foundation for machine learning models to learn from and enhance the system's ability to identify and respond to malfeasant emails.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for ensuring message security within organizations, the system comprising:
    a processing device;
    a non-transitory storage device containing instructions when executed by the processing device, causes the processing device to perform the steps of:

monitoring incoming communications associated with a plurality of users;

intercepting a message via an input engine, wherein intercepting the message via the input engine further comprises use of a firewall to intercept an inbound email, performing a header lookup to identify the intended recipient of the message, and performing examination of attachments to the message;

forwarding intercepted message data to an intelligence engine, wherein the intelligence engine is trained to identify one or more security issues in the intercepted message data, wherein training the intelligence engine further comprises:

analyzing the intercepted message data to identify security issue patterns;

constructing a plurality of labels for the intercepted message data based on content, source, and nature of security threat associated with the intercepted message data; and indexing the intercepted message data such that the intercepted message data is searchable based on constructing an index of each unique word in the intercepted message data;

generating a template as a sanitized version of the message, wherein the template emulates the message and is generated by removing one or more links or attached files;

analyzing the intercepted message data to determine one or more message characteristics related to a first user of the plurality of users;

determining that the intended recipient of the message is the intended recipient of multiple messages containing the one or more security issues;

triggering monitoring of a user identification number or account number linked to the first user, wherein the first user is the intended recipient of the intercepted message;

performing a threshold check comprising determining whether a number of intercepted messages directed to the first user within a predetermined time period is above a predetermined threshold; and in response to determining that the number of intercepted messages is above the predetermined threshold, triggering dispatch of the template of the message and a gamification link to an intended recipient of the message via a new message including dispatching training modules to the intended recipient for detection and response of the one or more security issues, wherein the training module is customized for the first user based on at least the indexed intercepted message data.

2. The system of claim 1, wherein the intelligence engine further comprises a natural language processing (NLP) machine learning model, wherein the processing further performs the steps of:

receiving raw message data comprising data associated with a body, subject line, sender information, and attachments of the message;

tokenizing textual data a plurality of tokens based on separating text in the message data into words and/or phrases, wherein separating the text comprises removing punctuation and special characters; and extracting characteristics associated with the message data comprising a frequency of occurrence of predetermined words.

3. The system of claim 1, further configured to trigger a second, simultaneous dispatch of the template of the message to a security operations center (SOC).

4. The system of claim 1, wherein the gamification link comprises a link to an educational module, wherein the educational module is specific to the one or more security issues in the intercepted message data.

5. The system of claim 1, wherein the intelligence engine continually updates a machine learning model with new data as additional message data is received.

6. A computer program product for ensuring message security within organizations, the computer program product comprising a non-transitory computer-readable medium comprising code causing an apparatus to:

monitor incoming communications associated with a plurality of users;

intercept a message via an input engine, wherein intercepting the message via the input engine further comprises use of a firewall to intercept an inbound email, performing a header lookup to identify the intended recipient of the message, and performing examination of attachments to the message;

forward intercepted message data to an intelligence engine, wherein the intelligence engine is trained to identify one or more security issues in the intercepted message data, wherein training the intelligence engine further comprises:

analyzing the intercepted message data to identify security issue patterns;

constructing a plurality of labels for the intercepted message data based on content, source, and nature of security threat associated with the intercepted message data; and indexing the intercepted message data such that the intercepted message data is searchable based on constructing an index of each unique word in the intercepted message data;

generate a template as a sanitized version of the message, wherein the template emulates the message and is generated by removing one or more links or attached files;

analyze the intercepted message data to determine one or more message characteristics related to a first user of the plurality of users;

determine that the intended recipient of the message is the intended recipient of multiple messages containing the one or more security issues;

trigger monitoring of a user identification number or account number linked to the first user, wherein the first user is the intended recipient of the intercepted message;

perform a threshold check comprising determining whether a number of intercepted messages directed to the first user within a predetermined time period is above a predetermined threshold; and in response to determining that the number of intercepted messages is above the predetermined threshold, trigger dispatch of the template of the message and a gamification link to an intended recipient of the message via a new message including dispatching training modules to the intended recipient for detection and response of the one or more security issues, wherein the training module is customized for the first user based on at least the indexed intercepted message data.

7. The computer program product of claim 6, wherein the intelligence engine further comprises a natural language processing (NLP) machine learning model, wherein the non-transitory computer-readable medium comprising code further causing the apparatus to:

receive raw message data comprising data associated with a body, subject line, sender information, and attachments of the message;

tokenize textual data a plurality of tokens based on separating text in the message data into words and/or phrases, wherein separating the text comprises removing punctuation and special characters; and extract characteristics associated with the message data comprising a frequency of occurrence of predetermined words.

8. The computer program product of claim 6, wherein the code further causes the apparatus to trigger a second, simultaneous dispatch of the template of the message to a security operations center (SOC).

9. The computer program product of claim 6, wherein the gamification link comprises a link to an educational module, wherein the educational module is specific to the one or more security issues in the intercepted message data.

10. The computer program product of claim 6, wherein the intelligence engine continually updates a machine learning model with new data as additional message data is received.

11. A method for ensuring message security within organizations, the method comprising:

monitoring incoming communications associated with a plurality of users;

intercepting a message via an input engine, wherein intercepting the message via the input engine further comprises use of a firewall to intercept an inbound email, performing a header lookup to identify the intended recipient of the message, and performing examination of attachments to the message;

forwarding intercepted message data to an intelligence engine, wherein the intelligence engine is trained to identify one or more security issues in the intercepted message data, wherein training the intelligence engine further comprises:

analyzing the intercepted message data to identify security issue patterns;

constructing a plurality of labels for the intercepted message data based on content, source, and nature of security threat associated with the intercepted message data; and indexing the intercepted message data such that the intercepted message data is searchable based on constructing an index of each unique word in the intercepted message data;

generating a template as a sanitized version of the message, wherein the template emulates the message and is generated by removing one or more links or attached files;

analyzing the intercepted message data to determine one or more message characteristics related to a first user of the plurality of users;

determining that the intended recipient of the message is the intended recipient of multiple messages containing the one or more security issues;

triggering monitoring of a user identification number or account number linked to the first user, wherein the first user is the intended recipient of the intercepted message;

performing a threshold check comprising determining whether a number of intercepted messages directed to the first user within a predetermined time period is above a predetermined threshold; and in response to determining that the number of intercepted messages is above the predetermined threshold, triggering dispatch of the template of the message and a gamification link to an intended recipient of the message via a new message including dispatching training modules to the intended recipient for detection and response of the one or more security issues, wherein the training module is customized for the first user based on at least the indexed intercepted message data.

12. The method of claim 11, wherein the intelligence engine further comprises a natural language processing (NLP) machine learning model, wherein the method further comprises:

receiving raw message data comprising data associated with a body, subject line, sender information, and attachments of the message;

tokenizing textual data a plurality of tokens based on separating text in the message data into words and/or phrases, wherein separating the text comprises removing punctuation and special characters; and extracting characteristics associated with the message data comprising a frequency of occurrence of predetermined words.

13. The method of claim 11, wherein the method further comprises: triggering a second, simultaneous dispatch of the template of the message to a security operations center (SOC).

14. The method of claim 11, wherein the gamification link comprises a link to an educational module, wherein the educational module is specific to the one or more security issues in the intercepted message data.

15. The method of claim 11, wherein the intelligence engine continually updates a machine learning model with new data as additional message data is received.

* * * * *